(No Model.)

H. R. OSBORN.
RIM AND TIRE FOR VEHICLE WHEELS.

No. 595,333. Patented Dec. 14, 1897.

Witnesses
E. C. Wurdeman
S. S. Williamson

Inventor
Harmon R. Osborn
by Geo. H. Holgate
Attorney

UNITED STATES PATENT OFFICE.

HARMON R. OSBORN, OF GRANVILLE, NEW YORK.

RIM AND TIRE FOR VEHICLE-WHEELS.

SPECIFICATION forming part of Letters Patent No. 595,333, dated December 14, 1897.

Application filed February 2, 1897. Serial No. 621,600. (No model.)

*To all whom it may concern:*

Be it known that I, HARMON R. OSBORN, a citizen of the United States, residing at Granville, in the county of Washington and State of New York, have invented a certain new and useful Improvement in Rims and Tires for Vehicle-Wheels, of which the following is a specification.

My invention relates to a new and useful improvement in rims and tires for bicycle-wheels and the like, and has for its object to so construct a tire as to prevent its complete deflation by puncture, thereby leaving the tire sufficiently serviceable, though partially deflated to permit the continuation of a journey until reaching a point where the injury may be conveniently repaired.

A further object of my invention is to so construct the rim of the wheel as to completely incase the same within the tire, leaving no part thereof projecting from said tire, thus not only protecting the rim against injury by contact with obstructions, such as stones, but also making it impossible for the tire to become displaced relative to the rim and obviating the necessity of gluing or cementing the tire in place.

With these ends in view this invention consists in the details of construction and combination of elements hereinafter set forth, and then specifically designated by the claim.

In order that those skilled in the art to which this invention appertains may understand how to make and use the same, its construction and operation will now be described in detail, referring to the accompanying drawings, forming a part of this specification, in which—

Figure 1:
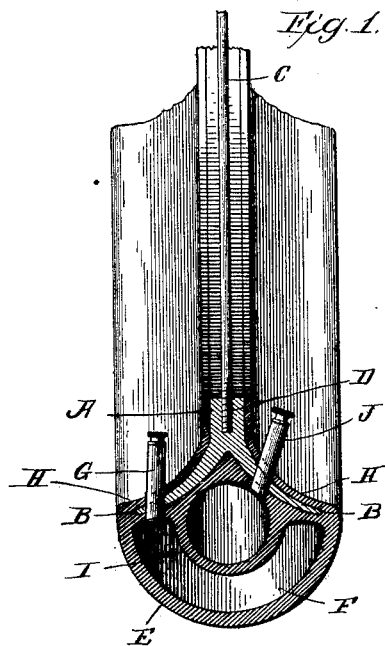
Figure 2:
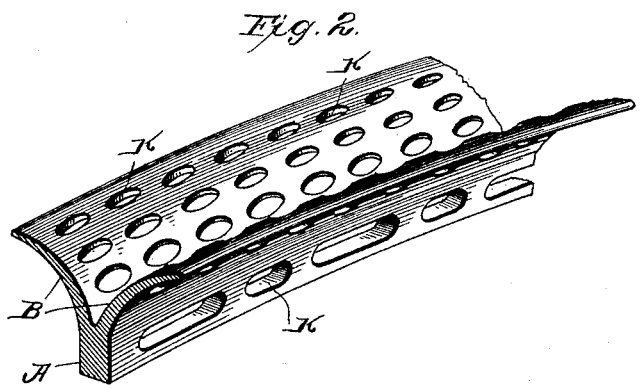

Figure 1 is a cross-section of a portion of a rim and tire made in accordance with my improvement, illustrating their coöperation; and Fig. 2 a perspective of a section of such a rim.

In carrying out my invention as here embodied I so form the rim as to provide a central rib A, from which diverge the flanges B, producing the general Y shape in cross-section, as clearly shown. The spokes C of the wheel may be threaded directly into the rib portion of the rim, as indicated at D, or they may be otherwise secured in said rim; but when the rim is of metal, such as aluminium, it is preferable that the spokes be thus threaded therein; but should the rim be of wood or like material it is obvious that a socket or nipple should be first placed in position within a suitable hole in the rim and the spoke threaded within this nipple; but I do not wish to be limited to the manner of securing the spokes within the rim, as this may be varied as fancy may elect.

The tire is so molded or formed as to produce the tread E, the interior of which serves as a compartment F, into which air may be forced under pressure through the valve-tube G, with the result of inflating this tread and rendering it firm, while leaving it compressible to a certain degree, after the manner of the ordinary pneumatic tire. Flaps H are also formed with the tire and are of such a shape in cross-section as to correspond to the outer surface of the rim, so that when the tire is in place upon said rim these flaps will completely inclose and protect this surface of the rim. An inner tube I is also formed with the tire, and a portion of its periphery in cross-section is concentric with the tread, as clearly shown in Fig. 1, while the inner portion of this inner tube is of such shape as to fit between and against the inner surfaces of the flanges, thus protecting these surfaces and at the same time holding the tire against sidewise displacement. The inner tube is inflated through the valve-tube J in the usual manner, and in practice this tube is first inflated, and thereafter the compartment F is filled with air under pressure, so as to distend the tread, when the tire is in condition for use, and it will be obvious that if while in use the tread should be deflated by puncture or otherwise it will collapse inward upon the inner tube and not only serve as a protector to said tube, but will be supported by the latter sufficiently to permit the continued use of the machine until a favorable opportunity is presented for the repair of the injury. It is therefore desirable that the inner tube shall project outward within the tread or outer section of the tire to such a degree as to render it efficient in giving the proper support to the tread should the latter become deflated.

In practice a tire made in accordance with my improvement will weigh but little, if any, more than the ordinary pneumatic tire, while at the same time it affords perfect protection to the rim and precludes the possibility of the machine becoming so disabled as to prevent its further use until repaired from the fact that a sharp-pointed object, such as a tack or nail, penetrating the tread will project within the compartment F and in no wise injure the inner tube.

It is also obvious that when the inner tube is inflated it will be impossible to remove the tire from the rim, and, if desired, the crawling of the tire upon the rim may be prevented by a series of holes or openings K being formed within said rim, and these openings will serve the further purpose of lessening the weight of the rim.

A rim made in accordance with my improvement will be found to be exceedingly strong relative to the amount of material therein, since its shape is such as to most advantageously receive the strains transmitted thereto, and since it is thoroughly protected from contact with exterior objects its edges will not becomed chafed by such contact and the rider will not receive the disagreeable vibrations incident to the edges of the rims of his wheels coming in contact with hard substances.

While I have here shown the inner tube formed with the tire, it is obvious that this tube might be made separate therefrom and placed therein in the position shown, and it would be held in place when inflated by the inward expansion thereof and would serve many, if not all, of the purposes accomplished by the construction just described.

Of course it will be understood that the tire may be composed of any suitable material, either in simple or compound form, such as a fabric covered upon one or both sides with rubber, and this I do not lay claim to and do not wish to be limited to any particular material or arrangement of a composite material for the formation of the tire.

If found desirable, both the space next back of the tread and the space within the inner tube may be filled, or partly so, with a cushioning material, such as sponge-rubber, in order that should the tire become deflated by puncture or otherwise it may be left more serviceable than if no provision of this kind were made. This is especially advantageous in connection with vehicles other than bicycles in that such vehicles when drawn by horses would not be affected by the slight increase in weight.

Having thus fully described my invention, what I claim as new and useful is—

In combination, a rim Y-shaped in cross-section, the flanges thereof being perforated, a tire having its inner surface of a shape to fit between the flanges of the rim and a semicircular tread-surface, a wall on the inside of the tire formed with the surface against the rim and extending around concentric with the tread forming a cylindrical tube surrounded by an air-compartment, said compartment being of uniform height throughout its width, valves leading to each of the compartments, the pressure of the air forcing the inner surface of the tire into the perforations of the flanges, substantially as and for the purpose described.

In testimony whereof I have hereunto affixed my signature in the presence of two subscribing witnesses.

HARMON R. OSBORN.

Witnesses:
 EDGAR D. LADD,
 C. B. PATTERSON.